UNITED STATES PATENT OFFICE 2,194,672

METHOD OF PRODUCING A FOOD PRODUCT HAVING A HIGH LACTIC ACID, ENZYME, AND VITAMIN CONTENT

Clarence M. Porter, Woodward, Leroy V. Porter, Altoona, and Edward R. Hurlock, Woodward, Iowa No Drawing. Application April 25, 1938, Serial No. 204,116

2 Claims. (Cl. 99—1)

The principal object of our invention is to provide a method of culturing organisms of the lacto-bacillus group derived from grain as a prolific source of lactic acid.

A further object of this invention is to provide a method of culturing organisms in grain to provide a prolific source of generic ingredients embodying beneficial and essential elements necessary in food products.

A still further object of our invention is to provide a method of inducing beneficial organisms into food products by the preparation of a parent initiating culture for propagating extremely large bacilli which may be induced over into subsequent cultures and that are extremely resistant and have a long life expectancy, to provide a great amount of lactic acid in the food products.

A still further object of this invention is to provide a method for the manufacture of a cereal having a high content of vitamins, enzymes, and protective organisms in concentrated form that is constant and stable and which is easily prepared.

These and other objects will be apparent to those skilled in the art.

It has long been known that lactic acid fermented from milk or mash and generated by organisms of the lacto-bacillus group was healthful and beneficial in the food diet. Heretofore the culturing of the organisms has been promoted through the use of yeast and milk for the preparation of parent or initial culture. This has been very unsatisfactory due mainly to the fact that the organisms cultured were weak, short-lived, and were unproductive of large quantities of lactic acid. Furthermore, this method of culturing these organisms has been complicated. We have overcome such disadvantages as will be appreciated and as will be hereinafter set forth.

The initiating processes are developed from strains of organisms derived from common sources such as grain and are subjected to the cultural influences which I will now describe.

A mash composed of approximately 55% bran, 25% shorts and 20% wheat germ is incubated at a temperature approximating 37.5 degrees centigrade. From this original culture, in which the lacto-bacillus grows vigorously, two types of organisms will be formed in appreciable numbers. The morphological characteristics of these two organisms are:

Organism 1.—Medium size rods with rounded ends three times as long as broad. Spores are not formed. Rods occur singly most of the time but are noted at intervals to be in pairs or short chains. Tendency to pleomorphism.

Organism 2.—Very long rods occurring in filamentous form, rarely found single. Spores are not formed.

Organism No. 1 does not appear to answer exactly the description of any organism found or described in literature, but it is definitely a member of the lacto-bacillus group being closely related to the organisms occurring in sour mash.

Organism No. 2 answers very closely the description of a well-known strain of lacto-bacillus and is probably, with exception to some variations in carbohydrate reactions, identical with this organism.

In the preparation of our parent initial culture, it will be found that we incorporate these certain species of organisms which continue into subsequent cultures. There are a large number of organisms included in the lacto-bacillus group which are very closely related and which are difficult to differentiate. Morphologically and culturally these organisms are very similar to the organisms occurring naturally in cereals. Carbohydrate reactions serve best to differentiate between these organisms but even these may be very confusing. In our method we depend upon the original culture species of mycoderma and a specie of saccharomyces naturally found in cereals. Upon culturing of the composite, it will be observed that the mycoderma is carried through all of the various stages of culture. The saccharomyces, however, will thrive only until an acid concentration of a definite level is obtained whereupon it disappears. The biological function of this last named organism has, however, been utilized and certain of its properties such as its enzymatic characteristics and vitamins are carried over to and contained in the completed culture.

The culture is allowed to proceed, under incubation for a period of 48 hours. During this time lactic acid is formed in large quantities, and after 48 hours the rate of production of lactic acid levels off to a point where it formed very slowly. Therefore, 48 hours is all of the time necessary for the incubation of the culture. The presence of lactic acid is determined by the ferric chloride test, which is the common test used in detecting the presence of lactic acid. The quantity of acid present is determined by titration with a standard solution of alkali.

Enzymes liberated by the organisms themselves and those occurring naturally in the cereals enter into the process of culturing. They assist in breaking down the carbohydrate of the cereals with the formation of lactic acid. The presence of diastase, maltase, invertase, and lactase has been demonstrated and by means of the starch-iodine test we have found that the finished composite hydrolizes approximately ten times its own weight of starch.

The dehydration of the final culture plus the cereal food ingredient causes a reduction in the number of live organisms originally contained in the culture. It does not matter whether or not all the organisms are alive or dead in the finished cereal, as they have performed their biological function in the culture and have contributed their enzymatic properties. Obviously, sufficient viable organisms will be retained to permit the further culturing of the dry product when transplanted to starch compounds and when as such it is desirable.

It has long been known and appreciated that symbiotic activity or inter-relationships exist between certain species of bacteria and also between bacteria and some of the saccharomycetes.

Certain lactic acid bacteria and saccharomycetes are incapable of fermenting maltase and lactase by themselves, and by the action of the organisms, when cultured together, the decomposition of the fermentive elements is accomplished. It is therefore vitally material, in order to obtain a high lactic acid content, to use selected strains of organisms in the culture so that they may act simultaneously. This we have found to be a natural biological relationship in the cereals. These cultures must be controlled in order to obtain the maximum of fermentation without encountering the volatile acids or other by-products which might disturb the fermentation process. A rapid formation of lactic acid is highly desirable in order to eliminate the production of undesirable products and putrefaction usually occurring after a certain stage of formation of lactic acid has been accomplished. By the use of our process, exceedingly large lacto-bacilli are propagated, releasing the lactic acid content rapidly. It is necessary in any product having beneficial characteristics, that it contain both starch splitting enzymes and the enzyme which hydrolizes lactose to galactose and to glucose.

Lactase is present in certain fungi, plants, bacteria, and saccharomyces, and is the enzyme aiding digestion and is used for supplementing the usual enzyme found in the digestive system. By carefully controlling the heat factor during the culture of the parent initiating culture, much of the vitamin content of the grain is retained and large quantities of vitamin B as well as quantities of the other known vitamins are present in the finished product. By the use of our specific culture of the bacteria found in grain and natural food products, a product rich in lactic acid and enzyme content is assured. By controlling the heat factor of the culture and limiting the time of culturing, the vitamins are retained and the culture is stopped before harmful reaction sets in. The mixing of the finished culture with the food product in a mash form and the dehydration of the resultant mixture does not decrease the beneficial elements obtained by the vitalized culture.

In subsequent cultures, some of the parent culture can be introduced into the mash and the mash may be enriched with pure dextrose or diastatic malt for increasing the speed of growth of the bacillus and increasing or controlling the production of lactic acid.

All of the lacto-bacillus group are beneficial in the finished food product and any grain furnishing strains of this group may be used. The only exception in the lacto-bacillus group being *L. acidophilus* which is not found in our culture of grain mash.

The proportions and types of grains may be varied in order to control the biological propagation of healthy lactic acid forming bacillus.

Thus it will be seen that we have provided a method of culturing organisms of the lacto-bacillus group present in selected grains and the enzymes naturally associated with them, that assures the rapid propagation and rugged character of the organisms and which in addition will provide large quantities of lactic acid and enzymatic constituents in short periods of culture. Furthermore, the culture can be obtained well within a temperature range which does not inactivate or harm the vitamin constituent of grain.

Some changes may be made in the constituent stage of our method of culturing bacillus from grain in the presence of an enriching agent without departing from the true spirit and purpose of the invention.

We claim:

1. The method of producing a food product having a high lactic acid, enzyme, and vitamin content comprising, the culturing of lacto-bacillus from grain in the presence of pure dextrose at an incubator temperature of approximately 37.5° C. and the introduction of the organic culture to a food product.

2. The method of producing a food product having a high lactic acid, enzyme, and vitamin content comprising, the culturing of lacto-bacillus derived from grain in the presence of pure dextrose at an incubative temperature of approximately 37.5° C., the introduction of the culture to a food product, and lastly the dehydration of resultant composite at a temperature approximately equal to the incubative culture.

CLARENCE M. PORTER.
LEROY V. PORTER.
EDWARD R. HURLOCK.